(12) United States Patent
Albouze et al.

(10) Patent No.: US 8,972,535 B2
(45) Date of Patent: *Mar. 3, 2015

(54) AUTOMATIC CONFIGURATION OF COMPUTERS IN A NETWORK

(75) Inventors: Jean Francois Albouze, Boulder Creek, CA (US); Michael R. Margolis, San Jose, CA (US)

(73) Assignee: Apple Inc., Cupertino, CA (US)

( * ) Notice: Subject to any disclaimer, the term of this patent is extended or adjusted under 35 U.S.C. 154(b) by 693 days.

This patent is subject to a terminal disclaimer.

(21) Appl. No.: 12/468,816

(22) Filed: May 19, 2009

(65) Prior Publication Data

US 2009/0228459 A1    Sep. 10, 2009

Related U.S. Application Data

(63) Continuation of application No. 10/928,026, filed on Aug. 26, 2004, now Pat. No. 7,587,495.

(51) Int. Cl.
| | |
|---|---|
| G06F 15/177 | (2006.01) |
| G06F 15/16 | (2006.01) |
| G06F 15/173 | (2006.01) |
| H04L 29/12 | (2006.01) |
| H04L 12/24 | (2006.01) |
| H04L 29/08 | (2006.01) |
| H04W 80/04 | (2009.01) |

(52) U.S. Cl.
CPC .... H04L 29/12009 (2013.01); H04L 29/12207 (2013.01); H04L 41/082 (2013.01); H04L 61/20 (2013.01); H04L 67/34 (2013.01); H04W 80/04 (2013.01)
USPC ............ 709/220; 709/217; 709/224; 709/231

(58) Field of Classification Search
USPC ........................................................ 709/217
See application file for complete search history.

(56) References Cited

U.S. PATENT DOCUMENTS

| | | | |
|---|---|---|---|
| 5,960,213 A | * | 9/1999 | Wilson .............................. 710/2 |
| 6,892,230 B1 | | 5/2005 | Gu et al. |
| 7,299,304 B2 | | 11/2007 | Saint-Hilaire et al. |

(Continued)

OTHER PUBLICATIONS

"Zero Configuration Networking (Zeroconf)", Nov. 2002, pp. 1-5, www.zeroconf.org.

(Continued)

Primary Examiner — Karen Tang
(74) Attorney, Agent, or Firm — Park, Vaughan, Fleming & Dowler LLP

(57) ABSTRACT

A system for automatic configuration of computers on a network is disclosed. In a first aspect a storage area network is disclosed. The network comprises at least one controller; and a plurality of clients coupled to the at least one controller. The network includes a storage device coupled to the at least one controller and the plurality of clients. The controller upon attachment to the network registers itself and notifies the plurality of clients. The plurality of clients then interrogates the controller. Each of the plurality of clients updates its configuration based upon the interrogation.

In a second aspect, a method for configuration of computers in a network is disclosed. The method comprises registering at least one controller upon attachment to the network and notifying a plurality of clients by the at least one controller. The method includes interrogating the at least one controller by each of the plurality of clients. The plurality of clients are updated based upon the interrogation.

28 Claims, 5 Drawing Sheets

Client

102

Controller

104

(56) References Cited

U.S. PATENT DOCUMENTS

| | | | |
|---|---|---|---|
| 7,885,231 B2* | 2/2011 | Kim et al. | 370/331 |
| 7,990,943 B2* | 8/2011 | Petersen et al. | 370/349 |
| 8,660,516 B2* | 2/2014 | Vikberg et al. | 455/404.1 |
| 2002/0026525 A1* | 2/2002 | Armitage | 709/238 |
| 2002/0168938 A1* | 11/2002 | Chang | 455/41 |
| 2003/0063608 A1 | 4/2003 | Moonen | |
| 2004/0153548 A1 | 8/2004 | Latvakoski et al. | |
| 2004/0212497 A1 | 10/2004 | Stilp | |
| 2004/0248601 A1* | 12/2004 | Chang | 455/500 |
| 2005/0090248 A1* | 4/2005 | Shen et al. | 455/432.1 |
| 2006/0092861 A1* | 5/2006 | Corday et al. | 370/256 |
| 2006/0291434 A1* | 12/2006 | Gu et al. | 370/338 |
| 2007/0274240 A1 | 11/2007 | Weidenhaupt et al. | |
| 2013/0128894 A1* | 5/2013 | Shah et al. | 370/401 |

OTHER PUBLICATIONS

Johns, Heath "Understanding Zeroconf and Multicast DNS," Dec. 2002, pp. 1-8.

Palmila, Petri "Zeroconf and UPnP Techniquies," Helsinksi University of Technology, 2007, pp. 1-5.

Thaler, Dave et al., "Zeroconf Multicast Address Allocation Protocol," Oct. 2002, pp. 1-18.

Williams, A. "Requirements for Automatic Configuration of IP Hosts," Sep. 2002, Motorola, pp. 1-28.

\* cited by examiner

AUTOMATIC CONFIGURATION OF COMPUTERS IN A NETWORK

FIELD OF THE INVENTION

The present invention relates to computer networks and more particularly to a system and method for configuring computers in such a network.

BACKGROUND OF THE INVENTION

A typical storage area network (SAN) is usually composed of computers acting as controllers (a.k.a. metadata controllers) and computers acting as clients (ex: video editing workstations). All computers are connected between each other using an internet protocol (IP) network and connected to a storage pool (ex: RAID systems) using Fiber Channel interfaces.

Within the SAN or from outside such as from a computer connected to the Internet, a computer can run a SAN administration software in order to setup and monitor meta-data controllers, by remotely connecting to each controller using server manager technology, a client/server administrative solution.

SAN administrators usually need to configure every single computer that is part of a SAN. Typical configuration tasks include specifying what other computers on the SAN are the metadata controllers or the "arbitrators" of file exchanges.

Such configuration tasks usually occur any time a new computer is physically disconnected to the SAN or during the initial setup of the SAN, in this case many computers may need to be configured.

Accordingly, what is needed is a system that allows for automatic configuration of a plurality of devices on a computer network. The system should be efficient, easy to use and easily adaptable to existing networks. The present invention addresses such a need.

SUMMARY OF THE INVENTION

A system for automatic configuration of computers on a network is disclosed. In a first aspect a storage area network is disclosed. The network comprises at least one controller; and a plurality of clients coupled to the at least one controller. The network includes a storage device coupled to the at least one controller and the plurality of clients. The controller upon attachment to the network registers itself and notifies the plurality of clients. The plurality of clients then interrogates the controller. Each of the plurality of clients updates its configuration based upon the interrogation.

In a second aspect, a method for configuration of computers in a network is disclosed. The method comprises registering at least one controller upon attachment to the network and notifying a plurality of clients by the at least one controller The method includes interrogating the at least one controller by each of the plurality of clients. The plurality of clients are updated based upon the interrogation.

In a third aspect, a client computer is disclosed. The client computer includes a file system; and an operating system for communicating with the file system. The operating system includes the discovery mechanism. The client is notified of a registration of at least one controller by the discovery mechanism and interrogates the at least one controller and updates its configuration via the file system and the discovery mechanism.

An advantage of a system and method in accordance with the present invention is that when client computers auto configure themselves, it saves administrators a great deal of time and effort since administrators no longer need to visit or remotely connect to each computer and perform repetitive tasks.

DETAILED DESCRIPTION OF THE INVENTION

The present invention relates to computer networks and more particularly to a system and method for configuring computers in such a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention takes advantage of the discovery mechanism inherent within each of the clients and controllers of a network to allow for the configuration of the clients within a network whenever a new controller appears on the network. In so doing, automatic configuration of devices on a SAN network is accomplished in a minimal amount of time. To describe the features of the present invention in more detail, refer now to the following discussion in conjunction with the accompanying figures.

Figure 1:
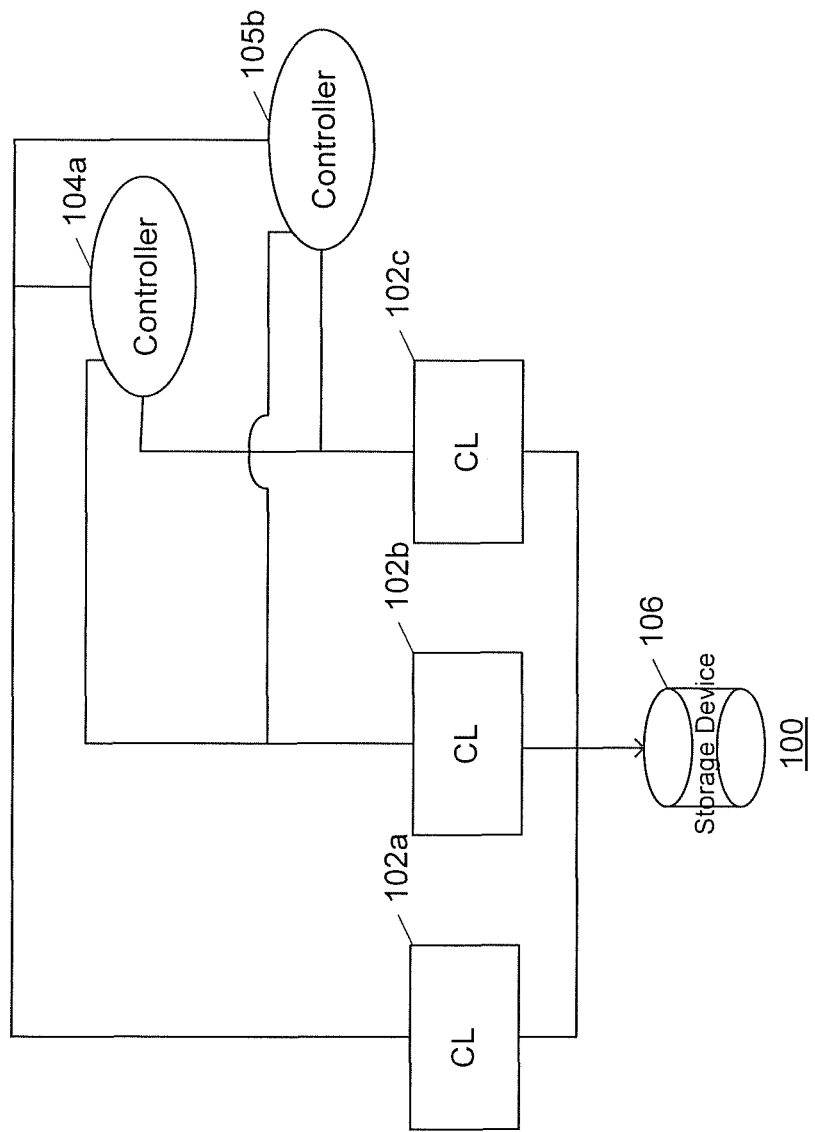
FIG. 1 illustrates a conventional storage area network (SAN) system.

FIG. 1 illustrates a storage area network (SAN) system 100. The SAN system 100 includes a plurality of clients 102a-102c coupled together via a network such as fiber channel to a storage device 106. At least one controller (in this case two controllers 104a and 104b) are coupled to each of the clients 102a-102c and the storage device 106 as is seen.

Figure 2:
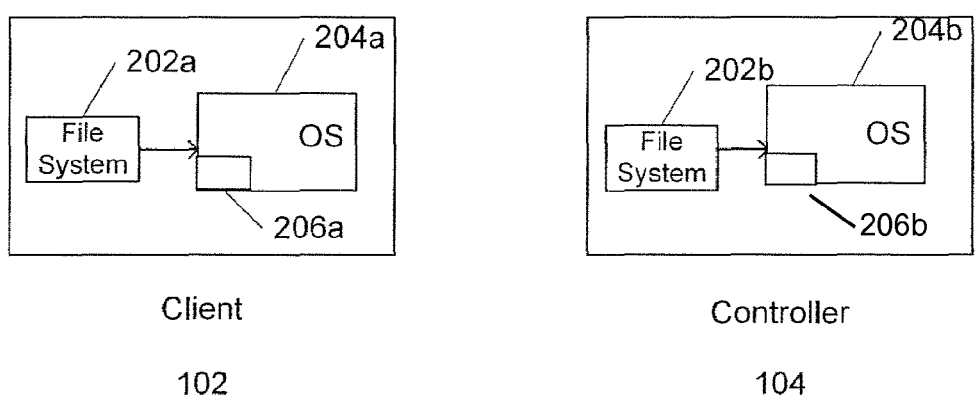
FIG. 2 illustrates a simple block diagram of a client and controller.

FIG. 2 illustrates a simple block diagram of a client 102 and controller 104. A file system 202a and 202b as well as an operating system (OS) 204a and 204b are within both the client 102 and controller 104 respectively. Within each of the OS 204a and 204b is a discovery mechanism 206a and 206b such as Rendezvous, a product offered by Apple Computer, Inc., which allows for the automatic discovery of computer devices and services on an IP network.

Automatic configuration of computers in accordance with the present invention on a SAN relies on a discovery mechanism such as Rendezvous by Apple Computer. Rendezvous enables automatic discovery of computers, devices, and services on IP networks. Rendezvous uses industry standard IP protocols to allow devices to automatically find each other without the need to enter IP addresses or configure servers. Rendezvous requires that devices implement three essential things. These devices must be able to:

1. Allocate IP addresses without a DHCP server
2. Translate between names and IP addresses without a DNS server 3. Locate or advertise services without using a directory server.

In addition, other technologies such as the ability for a local program to remotely access information from another computer with full or limited privileges can be utilized by a system and method in accordance with the present invention to allow for automatic configuration of computers in a network.

A system and method in accordance with the present invention can be implemented utilizing a computer readable medium which may be any kind of recording device that stores computer system-readable data, such as ROM, RAM, CD-ROM, magnetic tape, floppy disks, optical storage devices, or includes one or more data signals embodied in a carrier wave (e.g., a transmission over the Internet).

Figure 3A:
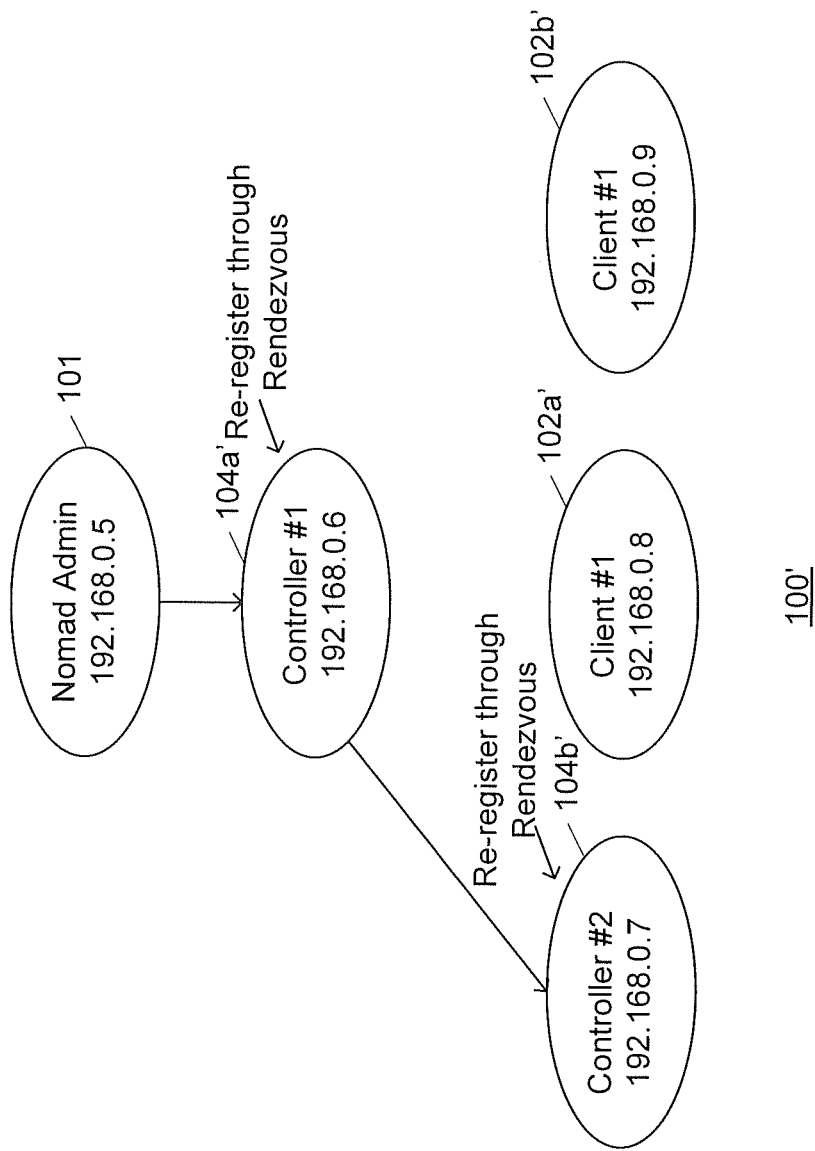
FIGS. 3A and 3B illustrate a system configuration in accordance with the present invention.
Figure 3B:
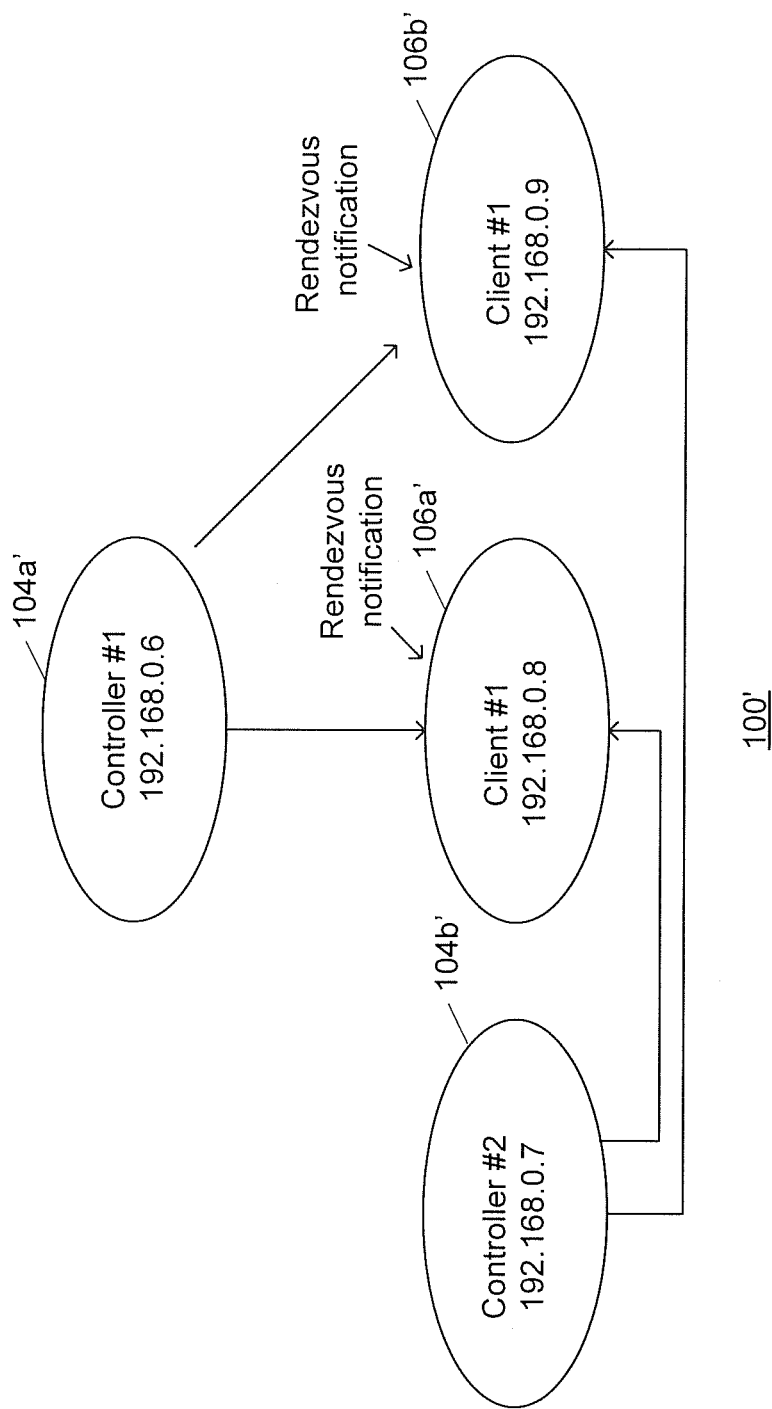
Figure 4:
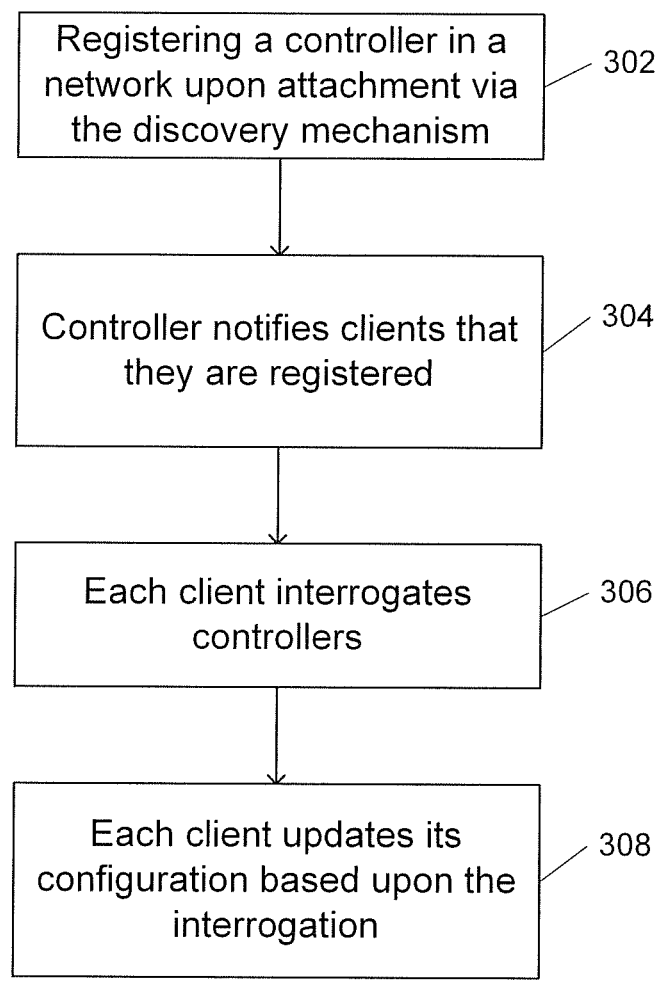
FIG. 4 is a flow chart of a configuration system in accordance with the present invention.

FIGS. 3A and 3B illustrate a system configuration in accordance with the present invention. FIG. 4 is a flow chart of a configuration system in accordance with the present invention.

Referring to FIG. 3A, when an administrator 101 sets up one or more controllers 104a and 104b (either from the genesis case by giving a computer the role of a controller or by adding a new computer and giving it the role of a controller), the one or more controllers 104a and 104b registers their "signature" utilizing the discovery mechanism.

Referring now to FIG. 4 in conjunction with FIGS. 3A and 3B, controllers 104a and 104b are registered in a network upon attachment via the discovery mechanism (FIG. 3A), via step 302. The one or more controllers 104a and 104b then notify the plurality of clients 106a and 106b that they are registered (FIG. 3B), via step 304. This notification occurs, for example, by the controller broadcasting its IP address to the clients.

As is seen in FIG. 3B, the IP address at controller 104a (192.168.0.6) is broadcast to clients 106a and 106b. Thereafter each of the one or more clients 104a and 104b interrogates the one or more controllers 104a and 104b, via step 306. This interrogation, for example, includes accessing information about the controller and the capabilities. Finally, each of the one or more clients 106a and 106b updates their configuration based upon the interrogation, via step 308.

As is well known, in a SAN network it is possible to have controllers which can be interrogated by a client, but that controller is not part of the network. In a system and method in accordance with the present invention, any client on a network starts a synchronization sequence by interrogating all controllers on the network, filtering out those controllers which are not part of the same network and querying the configuration of the first controller coupled to the network. The client then updates its configuration and is ready to access resources on the network. This happens automatically and transparently without any human intervention.

One will recognize that an IP network (typically a sub-net) may be used to host several independent networks which is why the synchronization sequence is not trivial, since a client needs to find a controller that manages the same storage device sets the clients sees. Since it is not possible for a controller to register its "view" of the storage device sets with the discovery mechanism (this data could be too big) then it requires the subsequent interrogation process aforementioned.

A significant advantage of a system and method in accordance with the present invention is that when client computers auto configure themselves once attached to a SAN network, it saves administrators a great deal of time and effort since administrators no longer need to visit or remotely connect to each computer and perform repetitive tasks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A system, comprising:
   a controller;
   a client; and
   a network to which the client and the controller are coupled;
   wherein the controller performs operations for:
      upon attachment to the network, registering and sending a notification of the registering to the client; and
   wherein the client performs operations for:
      interrogating the controller to determine whether the controller manages a same storage device set that is available to the client;
      upon determining that the controller manages the same storage device set that is available to the client, querying the controller for a configuration of the controller; and
      updating the client's configuration based on the configuration of the controller.

2. The system of claim 1, wherein the storage device set comprises:
   at least one storage area device coupled to the network, the at least one storage area device being accessible by the client after updating the client's configuration based on the configuration of the controller.

3. The system of claim 1, wherein, upon registration on the network, the controller notifies the client that the controller is registered on the network.

4. The system of claim 1, wherein interrogating the controller comprises accessing information about the controller and the controller's capabilities.

5. The system of claim 1, further comprising:
   one or more additional controllers coupled to the network.

6. The system of claim 3, further comprising:
   a discovery mechanism in the controller, wherein the controller notifies the client via the discovery mechanism.

7. The system of claim 1, further comprising:
   a discovery mechanism in the client, wherein the discovery mechanism interrogates the controller.

8. The system of claim 5, wherein, when interrogating the controller to determine whether the controller manages the same storage device set that is available to the client, the client performs operations for:
   interrogating each of the controller and the one or more additional controllers to determine if each controller manages the same storage device set that is available to the client; and
   filtering out controllers that do not manage the same storage device set that is available to the client.

9. A method, comprising:
   in a controller coupled to a network, performing operations for:
      upon attachment to the network, registering and sending a notification of the registering to a client coupled to the network;
      receiving and responding to an interrogation from the client, the interrogation configured to determine whether the controller manages a same storage device set that is available to the client; and when the controller manages the same storage device set that is available to the client, receiving and responding to a query for a configuration of the controller from the client, the response comprising information about the configuration of the controller configured to be used for updating the client.

10. The method of claim 9, wherein the storage device set comprises at least one storage area device that is accessible by the client after updating the client's configuration based on the configuration of the controller.

11. The method of claim 9, further comprising:
registering the controller on the network;
upon registration on the network, notifying the client that the controller is registered on the network.

12. The method of claim 9, wherein the interrogation comprises a request for information about the controller and the controller's capabilities.

13. The method of claim 9, wherein notifying the client comprises using a discovery mechanism in the controller to perform the notification.

14. A client coupled to a network, comprising:
an operating system that performs operations for:
receiving a notification of a registration of a controller;
interrogating the controller to determine whether the controller manages a same storage device set that is available to the client;
upon determining that the controller manages the same storage device set that is available to the client, querying the controller for a configuration of the controller; and
updating the client's configuration based on the configuration of the controller.

15. The client of claim 14, wherein interrogating the controller comprises accessing information about the controller and the controller's capabilities.

16. The client of claim 14, wherein one or more additional controllers are coupled to the network, and wherein interrogating the controller coupled to the network to determine whether the controller manages the same storage device set that is available to the client comprises:
interrogating each of the controller and the one or more additional controllers to determine if each controller manages the same storage device set that is available to the client; and
filtering out controllers that do not manage the same storage device set that is available to the client.

17. A non-transitory computer readable storage medium containing program instructions that, when executed by a client, cause the client to perform a comprising:
receiving a notification of a registration of a controller;
interrogating the controller to determine whether the controller manages a same storage device set that is available to the client;
upon determining that the controller manages the same storage device set that is available to the client, querying the controller for a configuration of the controller; and
updating the client's configuration based on the configuration of the controller.

18. The non-transitory computer readable storage medium of claim 17, wherein the storage device set comprises at least one storage area device that is accessible by the client after updating the client's configuration based on the configuration of the controller.

19. The non-transitory computer readable storage medium of claim 17, wherein the method further comprises:
receiving a notification from the controller when the controller is registered on a network.

20. The non-transitory computer readable storage medium of claim 17, wherein the interrogation comprises accessing information about the controller and the controller's capabilities.

21. The non-transitory computer readable storage medium of claim 17, wherein the interrogation is performed by a discovery mechanism in the client.

22. The non-transitory computer readable storage medium of claim 17, wherein one or more additional controllers are coupled to the network, and wherein, when interrogating the controller to determine whether the controller manages the same storage device set that is available to the client, the client performs operations for:
interrogating each of the controller and the one or more additional controllers to determine if each controller manages the same storage device set that is available to the client; and
filtering out controllers that do not manage the same storage device set that is available to the client.

23. A non-transitory computer readable storage medium containing program instructions that, when executed by a controller, cause the controller to perform a method, the method comprising:
registering and sending a notification of the registering to a client coupled to the network;
receiving and responding to an interrogation from a client coupled to the network, the interrogation configured to determine whether the controller manages a same storage device set that is available to the client; and
when the controller manages the same storage device set that is available to the client, receiving and responding to a query for a configuration of the controller from the client, the response comprising information about the configuration of the controller configured to be used for updating the client.

24. The non-transitory computer readable storage medium of claim 23, wherein the method further comprises:
registering the controller on the network; and
upon registration on the network, notifying the client that the controller is registered on the network.

25. The non-transitory computer readable storage medium of claim 24, wherein notifying the client comprises using a discovery mechanism in the controller to perform the notification.

26. The non-transitory computer readable storage medium of claim 23, wherein the interrogation comprises a request for information about the controller and the controller's capabilities.

27. The non-transitory computer readable storage medium of claim 23, wherein notifying the plurality of clients is performed by a discovery mechanism of the at least one controller.

28. The non-transitory computer readable storage medium of claim 23, wherein the storage device set comprises at least one storage area device that is accessible by the client after updating the client's configuration based on the configuration of the controller.

* * * * *